US012801957B2

United States Patent

(12) United States Patent
Feldman et al.

(10) Patent No.: US 12,801,957 B2
(45) Date of Patent: Nov. 17, 2026

(54) QUANTUM FIELD-PROGRAMMABLE ANALOG ARRAYS AND RELATED METHODS AND SYSTEMS

(71) Applicant: GENESEE VALLEY INNOVATIONS, LLC, Santa Clara, CA (US)

(72) Inventors: Aleksandar B. Feldman, Santa Cruz, CA (US); Morad Behandish, San Mateo, CA (US); Johan de Kleer, Los Altos, CA (US); Alexandre Perez, San Mateo, CA (US); Ion Matei, Santa Cruz, CA (US); Leora Morgenstern, Silver Spring, MD (US)

(73) Assignee: GENESEE VALLEY INNOVATIONS, LLC, Santa Clara, CA (US)

( * ) Notice: Subject to any disclaimer, the term of this patent is extended or adjusted under 35 U.S.C. 154(b) by 1228 days.

(21) Appl. No.: 17/490,641

(22) Filed: Sep. 30, 2021

(65) Prior Publication Data

US 2023/0101505 A1 Mar. 30, 2023

(51) Int. Cl.

| | |
|---|---|
| ***G06N 10/00*** | (2022.01) |
| ***G06F 8/41*** | (2018.01) |
| ***G06F 17/13*** | (2006.01) |

(52) U.S. Cl.
CPC ............. *G06N 10/00* (2019.01); *G06F 8/447* (2013.01); *G06F 17/13* (2013.01)

(58) Field of Classification Search
CPC ........ G06N 10/00; G06N 10/40; G06F 8/447; G06F 17/13
See application file for complete search history.

(56) References Cited

U.S. PATENT DOCUMENTS

| | | | | |
|---|---|---|---|---|
| 11,025,027 B2 | 6/2021 | Rolland et al. | | |
| 11,073,658 B2 | 7/2021 | Pérez López et al. | | |
| 2006/0261846 A1* | 11/2006 | Twigg | H03K 19/173 | 326/37 |
| 2009/0112564 A1 | 4/2009 | Schmieder | | |
| 2009/0198759 A1* | 8/2009 | Schmieder | G06G 7/02 | 706/56 |
| 2013/0318020 A1* | 11/2013 | Shapero | G06N 3/044 | 706/30 |

(Continued)

OTHER PUBLICATIONS

Kalyani-Garimella et al., "Low-Voltage Universal Cell (LVUC): A Compact Analog/Digital Logic Block for Mixed Signal FPGAs" (Year: 2006).*

(Continued)

*Primary Examiner* — Jack Chiang
*Assistant Examiner* — Brandon Bowers
(74) *Attorney, Agent, or Firm* — Vorys, Sater, Seymour and Pease LLP

(57) ABSTRACT

Quantum field-programmable analog arrays (FPAAs) may be useful in solving differential equations. For example, a quantum FPAA may comprise: an array of computational analog blocks (CABs) configured to perform a mathematical operation; and an interconnection network connecting the CABs, the interconnection network comprising communication paths and switches. Said quantum FPAAs may be useful in integrated chips, computing systems, and related methods.

12 Claims, 4 Drawing Sheets

(56) References Cited

U.S. PATENT DOCUMENTS

| | | | | |
|---|---|---|---|---|
| 2016/0118973 | A1* | 4/2016 | Thiagarajan | H03F 3/45475<br>307/109 |
| 2016/0285433 | A1* | 9/2016 | Johal | G06G 7/186 |
| 2018/0217117 | A1* | 8/2018 | Tran | H10K 30/151 |
| 2019/0369171 | A1* | 12/2019 | Swenson | G01R 33/0094 |
| 2023/0029063 | A1* | 1/2023 | Pérez López | H03K 19/17728 |

OTHER PUBLICATIONS

George et al., "A Programmable and Configurable Mixed-Mode FPAA SoC" (Year: 2016).*

Twigg et al., "Configurable analog signal processing" (Year: 2008).*

Newrock, "What are Josephson junctions? How do they work?", https://www.scientificamerican.com/article/what-are-josephson-juncti/#:~:text=Here%20is%20his%20explanation.,flow%20of%20direct%20electrical%20current. (Year: 1997).*

Dean R. D'mello, et al. Design approaches to field-programmable analog integrated circuits. Field-Programmable Analog Arrays. Springer, 1998.

Alexander Feldman, et al. The diagnostic competitions. AI Magazine, 2014.

Alexander Feldman, et al. Analog accelerator for simulation and diagnostics. In Proceedings of the Thirty-Second Conference on Innovative Applications of Artificial Intelligence (IAAI'20), New York, New York, pp. 1-6, 2020.

Elizabeth Gibney. D-wave upgrade: How scientists are using the world's most controversial quantum computer. Nature News, 541(7638):447, 2017.

Wilfried Haensch, et al. The next generation of deep learning hardware: Analog computing. Proceedings of the IEEE, 107(1):108{122, 2018.

Alejandro Perdomo-Ortiz, et al. Readiness of quantum optimization machines for industrial applications. Phys. Rev. Applied, 12:014004, Jul. 2019.

* cited by examiner $$\frac{dv}{dt} = \alpha v - \beta v w$$

$$\frac{dw}{dt} = \delta v w - \gamma w$$

$$\alpha = 1$$
$$\beta = 5$$
$$\gamma = 1$$
$$\delta = 3.5$$

QUANTUM FIELD-PROGRAMMABLE ANALOG ARRAYS AND RELATED METHODS AND SYSTEMS

FIELD OF INVENTION

The present disclosure relates to quantum field-programmable analog arrays (FPAAs) including systems and methods related thereto. Said quantum FPAAs may be useful in solving differential, integral, and/or other equations.

BACKGROUND

The scalability of conventional (digital) computing depends either on cramming more transistors on the limited surface area of the Central Processing Unit (CPU) chip or on increasing the clock frequency. Although up until now, it has been possible to double the number of transistors in a CPU every 18 months as predicted by the Moore's law, scientists expect physical constraints to soon end that. On the one hand, transistors cannot be made smaller than a few nanometers to avoid unacceptable off-state current leakage. On the other hand, the power consumption increases proportionally to the square of clock frequency, making clock-rates above 4 GHz economically not viable.

In the face of increasingly complex problems, there is an urgent need for alternative computing platforms that are not limited by the same physical constraints, scale better with problem complexity, and allow its users to solve many of the open problems in science and engineering.

The current understanding of complexity and tractability is bounded by the intrinsic limitations of digital computing to finitely describable representations. Unfortunately, a vast majority of scientific problems are categorized as "intractable" without some form of approximation because said problems are formulated in the uncountably infinite continuum spacetime. For example, many applications in defense and healthcare are limited by our inability to exactly solve differential equations (DE) governing multi-physics phenomena ranging from turbulence modeling to protein folding. The best solutions are invariably trade-offs between computational cost and loss of physical fidelity due to discretization.

SUMMARY OF INVENTION

The present disclosure relates to quantum FPAAs including systems and methods related thereto. Said quantum FPAAs may be useful in solving differential equations.

One aspect of the present disclosure includes a quantum FPAA comprising: an array of computational analog blocks (CABs) configured to perform a mathematical operation; and an interconnection network connecting the CABs, the interconnection network comprising communication paths and switches.

Another aspect of the present disclosure is an integrated chip comprising: the foregoing quantum FPAA for performing a computation using the array of CABs; a system-on-chip for controlling the computation; one or more ADCs for reading the results of the computation; one or more DACs for configuring the CABs of the quantum FPAA; a memory; and a field-programmable gate array.

Yet another aspect of the present disclosure is a method comprising: compiling an algorithm of interest to produce a compiled representation; mapping the compiled representation to yield an intermediate representation; scaling the intermediate representation to yield a scaled intermediate representation; executing the scaled intermediate representation on the foregoing quantum FPAA; and communicating an approximation of a solution to the algorithm of interest.

Another aspect of the present disclosure is a system comprising: a processor comprising the foregoing quantum FPAA; and a memory coupled to the processor.

BRIEF DESCRIPTION OF THE DRAWINGS

The following figures are included to illustrate certain aspects of the disclosure and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1:
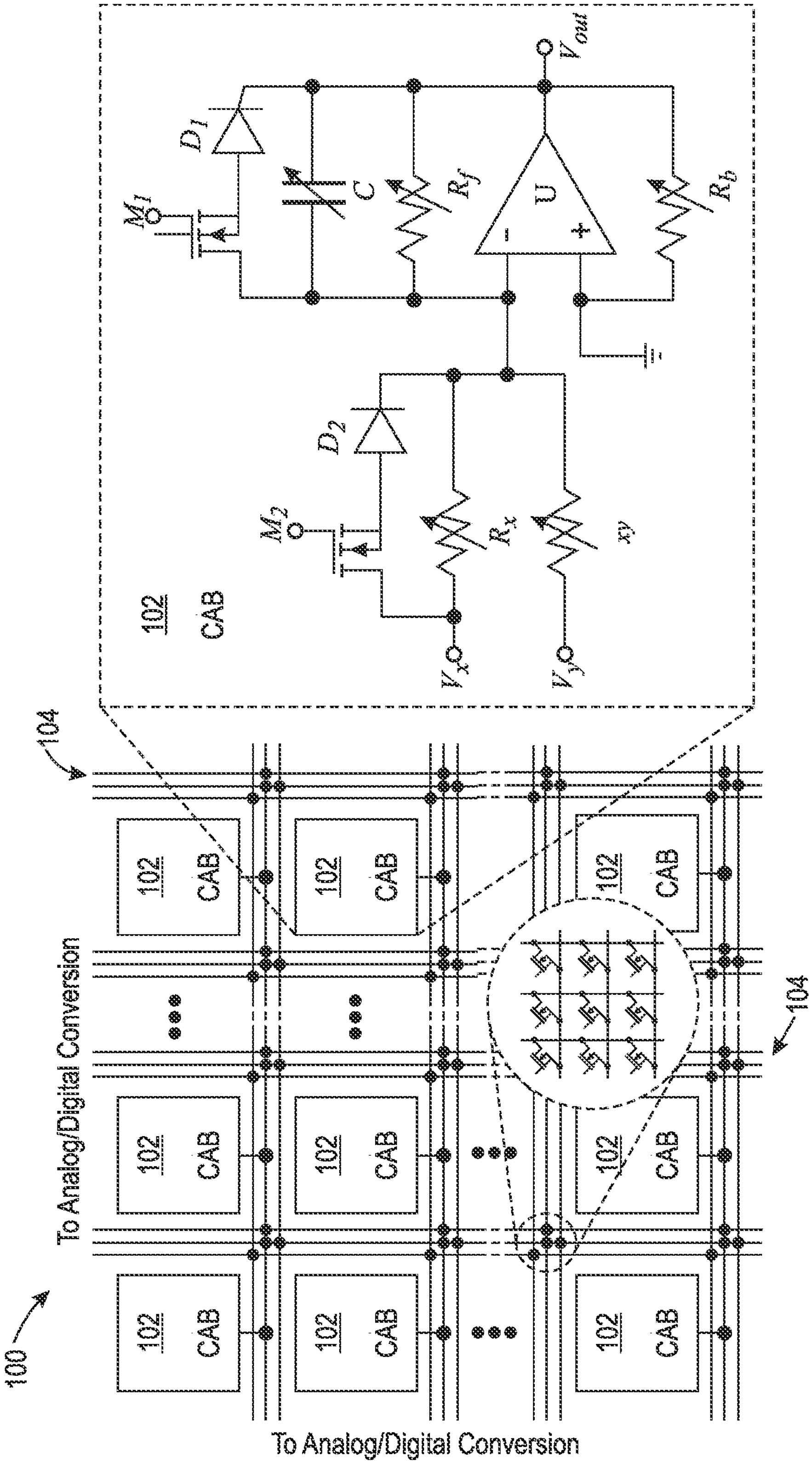
FIG. 1 illustrates a nonlimiting example of a quantum FPAA architecture.

The present disclosure relates to quantum FPAAs including systems and methods related thereto. Quantum FPAAs may generally be considered as an analog equivalent to field-programmable gate arrays (FPGAs). Quantum FPAAs achieve better performance compared to non-quantum FPAAs as they use approaches from quantum computing such as Josephson junctions, superconducting circuits, quantum entanglement, and quantum tunneling. A FPAA is a configurable (or programmable) analog circuit that may be programmed to behave in a customized way. For example, an FPAA can be configured to behave like a low-pass filter or an analog multiplier.

While conventional computers execute (or solve) algorithms step-by-step, the quantum FPAAs described herein aim to solve equations by directly propagating an electrical signal through an analog circuit.

Further, in classical computing, one of the most important properties of the computational process is the time it takes for an algorithm to compute a result. In equation solving and numerical methods, one important criterion is the quality of the approximation (any numerical representation of a solution of an equation can be thought of as an approximation). With classical computers one can increase the quality of approximation by investing more CPU time to accommodate the step-by-step approach to solving algorithms. In contrast, the quantum FPAAs described herein may be designed to takes advantage of parallel approaches to solving algorithms to improve the quality of the approximation. The quantum FPAA described herein suffers from degradation in the quality of the solution. This degradation is solved by solving the equations multiple times. That is, the quality of the solution may be able to be increased by repeating the equation multiple times and by averaging out the results (assuming all noise is Gaussian, etc.). The averaging out can be done in parallel as we can configure multiple parts of the quantum FPAA in an identical way to fill-up the unused computational analog blocks (CABs) and wires. Therefore, the quantum FPAAs described herein designed for such a parallel approach may achieve the same or better quality of approximation as a classical computing approach but faster than the classical computing approach.

Additionally, energy is an important factor in computing. In contrast to traditional computers, the quantum FPAAs described herein do not have a central clock. Advantageously, this leads to considerable reduction in energy and time expended, since most of the energy in classical computing is wasted in synchronizing the digital gates in a CPU.

There have been previous attempts to build analog computers. However, such attempts were often plagued with too much error propagating through the electrical circuit. Generally, digital computers compensate for the error at every clock operation by bringing the output of each gate to either a logical 0 or 1.

Recent advances in quantum computing have opened up new opportunities for building a new generation of hybrid quantum-analog computational platforms. Existing quantum computers manipulate quantum bits, a super-position of states, which are, at the macro-level, more continuous than discrete. Bringing these continuous-value measurements to 0 or 1, as often done today, discards a lot of information and delays the computational process. The quantum FPAAs described herein utilize hybrid quantum-analog computing architectures where errors may be reduced by using superconducting electrical components.

In contrast to classical computers that run programs, the quantum FPAAs described herein are designed to solve equations. Therefore, the quantum FPAAs, and related systems and methods, described herein may be useful in solving physics-based systems that include equations like ordinary differential equations, partial differential equations, differential algebraic equations, integro-differential equations, and combinations thereof.

The quantum FPAAs of the present disclosure are based on operational amplifiers. FIG. 1 illustrates a nonlimiting example of a quantum FPAA architecture 100. In this example, the quantum FPAA is part of an integrated circuit. The bulk of the integrated circuit having the quantum FPAA architecture 100 is occupied by an array of computational analog blocks (CABs) 102. As used herein, a "computational analog block" or "CAB" refers to a component that accepts an input voltage and an output voltage that are related by a specific mathematical function. Examples of CABs suitable for use in the quantum FPAA architecture 100 include (a) any analog circuit that can be configured to perform any mathematical operation and (b) a universal analog component whose functioning depends on a configuration of transistor switches within the CABs.

A combination of (a)-type and (b)-type CABs may be used. Suitable (a)-type CABs may be selected based on the range of mathematical operations needed for the quantum FPAA architecture 100.

A configurable interconnection network 104 comprising communication paths and switches is illustrated between the CABs 102. The communication paths may, for example, be wires, laser light, and the like, and any combination thereof. The communication may also be achieved with the passage of time. For example, an intermediate result may be stored in some quantum information storage and then retrieved. By using this switching network-on-chip, the CABs 102 may communicate with each other and may also interface with the outside world.

FIG. 1 also illustrates a high-level architecture of an individual CAB 102. Each CAB 102 may include an operational amplifier (or op-amp) 106, passive components, and transistor switches that allow the configuration of the CAB 102.

Depending on the configuration of the transistor switches, a CAB 102 may be configured to perform one of the following operations: gain, logarithmic, exponential, raising of a number to a power, integration, differentiation, and the like.

There are seven parameters that configure a CAB: the voltage applied to the gates of $M_1$ and $M_2$; the resistances of $R_x$, $R_y$, $R_f$, $R_b$; and the capacitance of C. To perform summation, for example, one would switch off $M_1$ and $M_2$, configure C=0 and $R_b$=1. It should be noted that FIG. 1 illustrates a high-level architectural diagram, so each passive component represents a possibly active circuit on its own. In the summation configuration, $V_{out}=-(F_f R_x^{-1} V_x + R_f F_y^{-1} V_y)$.

Another example is setting the CAB to perform exponentiation an open $M_2$ and disconnected C. Then, the governing equation becomes $V_{out}=-I_s R_x \exp(V_x V_T^{-1})$.

In another example, integration may be done by the variable capacitor C on the feedback of the op-amp. Making large capacitors on chip is difficult. However, in the configurations described herein, the differential equations can be preprocessed (or scaled) (e.g., symbolically) to change the "time constant" of the integrating CABs and allow for long simulations in shorter time. For example, slow systems result in high-frequency AC signals to pass through all op-amps. Further, room temperature op-amps do not have the same gain when the frequency increases, which limits the simulation speed. Therefore, changing the time constant as described herein may improve the functioning of the CABs and op-amps therein. Further, if some time constants are still long, which effects the performance of all op-amps, the use of superconducting amplifiers may mitigate the room temperature-gain issues.

In yet another example, multiplication may be performed with logarithms and summations.

In another example, while FIG. 1 illustrates a single CAB, a hierarchical structure may be implemented where multiple CABs are interconnected to, in essence, form a single CAB used in the quantum FPAAs of the present disclosure.

Accordingly, the CAB used in quantum FPAAs of the present disclosure may (a) comprise one or more CABs, (b) include a generic CAB(s), (c) include a specialized CAB(s), (d) include any suitable type of CAB(s), or (e) any combination of (a)-(d).

Quantum FPAAs may be made of superconducting materials. Examples of superconducting materials include, but are not limited to, niobium—titanium alloys, germanium—niobium alloys, niobium nitride alloys, yttrium barium copper oxide, magnesium diboride, fluorine-doped LaOFeAs, fullerenes, carbon nanotubes, graphene, and the like, and any combination thereof.

When using superconducting materials, the quantum FPAAs may include Josephson junctions.

Quantum FPAAs may be produced, in part or in whole, using lithographic methods.

The quantum FPAA architectures illustrated in FIG. 1 is a nonlimiting example. CABs in quantum FPAA architectures may be arranged in a variety of manners including, but not limited to, an interconnection network (e.g., illustrated in FIG. 1), a grid-like network, a ring-like network, a multi-layer (or 3-dimensional) array, hyper-cube-like network, and the like.

The quantum FPAAs of the present disclosure may be a portion of an integrated chip. Integrated chips may comprise one or more FPAAs described herein for performing computations, a system-on-chip for controlling the computation, one or more analog to digital converters (ADCs) for reading the results of the computation, one or more digital to analog converters (DACs) for configuring the CABs of the FPAAs, memory, and an FPGA.

The quantum FPAAs, and related systems and methods, of the present disclosure are preferably designed to solve equations like ordinary differential equations (ODEs), partial differential equations (PDEs), differential algebraic equations (DAEs), integro-differential equations (IDEs), and combinations thereof. To solve such equations, the equations may first be transformed into a series of computations that the quantum FPAA can perform.

Figures 2, 3:
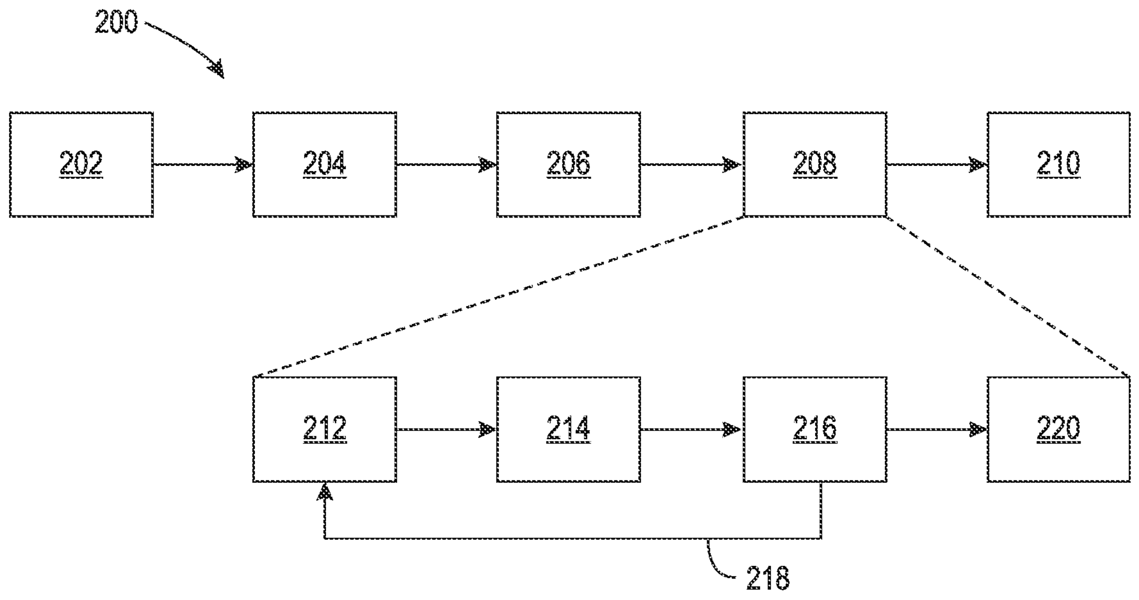
FIG. 2 illustrates a nonlimiting example of a method that incorporates the quantum FPAAs, and related systems and methods, of the present disclosure.
FIG. 3 illustrates a Lotka-Volterra predator-prey initial value problem (IVP) solved using an LTSpice simulation of a nonlimiting example quantum FPAA.

FIG. 2 illustrates a nonlimiting example of a method 200 that incorporates the quantum FPAAs, and related systems and methods, of the present disclosure. Generally, to solve the algorithms (e.g., a single algorithm or a series of algorithms) of interest, the algorithms are first translated into a form that the quantum FPAA can be configured.

In the illustrated method 200, algorithms may first be compiled 202. The compiled representation may be mapped 204 to an intermediate representation (IR) (e.g., a graph-like data structure). The IR may then be preprocessed (or scaled 206) (e.g., symbolically) to change the "time constant" of the CAB and allow for long simulations in shorter time. Generally, the IR and the scaling coefficients (or scaled IR) are the configuration or a representation thereof of the quantum FPAA (more specifically, the configuration or a representation thereof of the order of the mathematical operations to be performed by the CABs) to solve the algorithms of interest. Then, the scaled IR may be executed 208 using the quantum FPAA, and related systems and methods, of the present disclosure to achieve the approximation 210 of the solution to the algorithms of interest.

The steps of compiling 202, mapping 204, and scaling 206 may be performed by various software programs like SPICE, LTSPICE, Modelica, Matlab, Mathematica, Ansys, and the like, and any hybrid thereof. The software communicates with the quantum FPAA (e.g., sending a set of instructions to the system-on-chip for how to configure or reconfigure the interconnection network to achieve the CAB communication configuration needed to solve the algorithms of interest). The quantum FPAA may execute 208 the scaled IR by executing a sequence of operations. In the illustrated example, this series of operations includes (a) calibrating 212 the quantum FPAA (e.g., to account for initial charges of capacitors, temperature corrections, and the like), (b) resetting 214 the quantum FPAA, (c) performing 216 the mathematical operations according to the scaled IR, (d) repeating 218 N times the steps of calibrating 212, resetting 214, and performing 216 the mathematical operations, and (e) averaging 220 the results from performing 216 the mathematical operations. The solution from executing 208 the scaled IR with the quantum FPAA may be communicated (e.g., communicated from the quantum FPAA or extracted from the quantum FPAA) as the approximation 210 of the solution to the algorithms of interest.

Averaging 220 may be simple averaging of the values from all N times. Alternatively, averaging 220 may include filters (e.g., Gaussian filters) and/or thresholds to remove some of the values from all N times and reduce noise.

The steps of executing 208 the scaled IR may be performed N times in series, N times in parallel, L times in series and M times in parallel where L times M equals N, or some other variation of series and parallel executions of the scaled IR. Generally, higher N values improve the quality of the approximation 210.

Advantageously, the quantum FPAAs described herein are configurable to allow for maximizing the efficiency of the quantum FPAA and minimizing the computational time. For example, if (a) a quantum FPAA includes 10 CABs for performing a gain operation, 20 CABs for performing a logarithmic operation, 5 CABs for performing an exponential operation, 3 CABs for performing an integration operation, and 10 CABs for performing a differentiation operation and (b) executing the scaled IR require the use of 4 CABs for performing a gain operation, 6 CABs for performing a logarithmic operation, 2 CABs for performing an exponential operation, and 3 CABs for performing a differentiation operation, then the executing 208 the scaled IR may be twice in parallel, so the time to compute is cut by half or the N can be doubled for the same computing time but produce a higher quality approximation 210. Then, the same quantum FPAA may be used for a different algorithm of interest having a corresponding scaled IR that require the use of 2 CABs for performing a gain operation, 5 CABs for performing a logarithmic operation, 1 CABs for performing an exponential operation, and 1 CABs for performing a differentiation operation. Then, that same quantum FPAA may be reconfigured and execute 208 the scaled IR corresponding to the different algorithm of interest 4 times in parallel. Being able to reconfigure the quantum FPAA provides versatility in the hardware that improves efficiency, reduces computational time, and/or improves the quality of the approximation 210.

Because the quantum FPAAs, and related systems and methods, of the present disclosure are designed to solve equations like ODEs, PDEs, DAEs, IDES, and combinations thereof, the quantum FPAAs may be useful in solving equations associated with physics-based systems.

For example, a quantum FPAA, and related systems and methods, of the present disclosure may be used in solving an initial value problem for a system of coupled ODEs. Further, when the system of ODEs is derived from a lumped-parameter model of electrical and/or mechanical systems algebraic constraints may be imposed as well that can be handled by the quantum FPAA.

In another example, specialized simulators of electrical circuits like SPICE and simulation environments like the Modelica solver may be used for converting DAEs into scaled IRs for use in conjunction with a quantum FPAA, and related systems and methods, of the present disclosure. More specifically, universal DAE solvers like Modelica convert DAEs to ODEs by differentiating the algebraic constraints. A considerable advantage of the approach described herein that differentiation of the algebraic constraints may not be needed. For example, when Modelica solves a pendulum DAE, the algebraic constraint $L^2=a^2+b^2$ (the length of the pendulum) can be implemented in just four CABs where one can think of a and b as wire names.

Another approach to extending the quantum FPAA, and related systems and methods, of the present disclosure to solving governing equations in distributed multi-physics systems (e.g., PDEs) and multi-scale coupled systems in space and time (e.g., IDEs) is to semi-discretize these equations (i.e., discretize in space, leaving time as a continuum) to produce a large number of ODEs. Difference discretization schemes such as finite difference, finite volume, finite element, spectral, or particle-based methods, among others, can be used.

Another important application of the quantum FPAA, and related systems and methods, of the present disclosure is for general-purpose optimization, machine learning, and design space exploration. For example, the objective/cost/loss function is defined by the configuration of the quantum FPAA. It is possible to design a classical algorithm for gradient-free search that utilizes the ultra-fast forward propagation implemented by the quantum FPAA, and related systems and methods, of the present disclosure.

Figure 4:
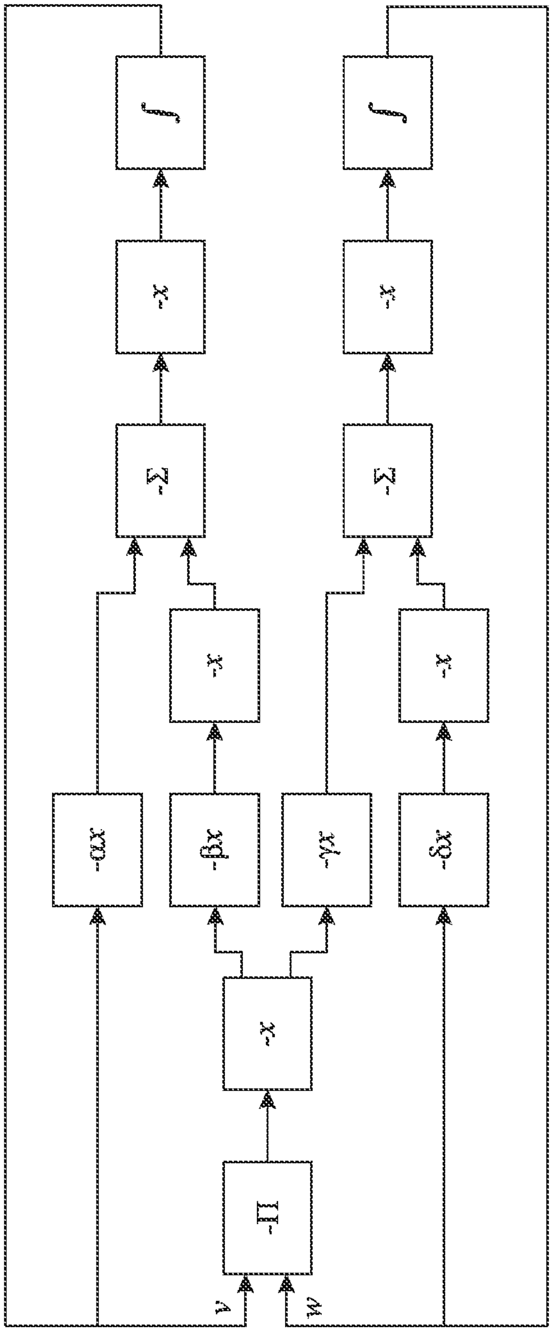
FIG. 4 illustrates a graph-like intermediate representation for the Lotka-Volterra IVP of FIG. 3.

To provide a more specific illustration of the quantum FPAA, and related systems and methods, of the present disclosure, a Lotka-Volterra predator-prey initial value problem (IVP) depicted in FIG. 3 was solved. Instead of using a physical quantum FPAA, a LTSpice simulation of a quantum FPAA was used. In this example, a unified Abstract Syntax Tree (AST) representation was compiled, which was then mapped to a graph-like IR (illustrated in FIG. 4) for the Lotka-Volterra IVP. The graph-like IR more closely resembles the analog implementation of a system of ODEs. Scaling is needed in this example because an analog electrical circuit for solving ODEs leads to more constraints compared to using a CPU-based integrator.

Figure 5:
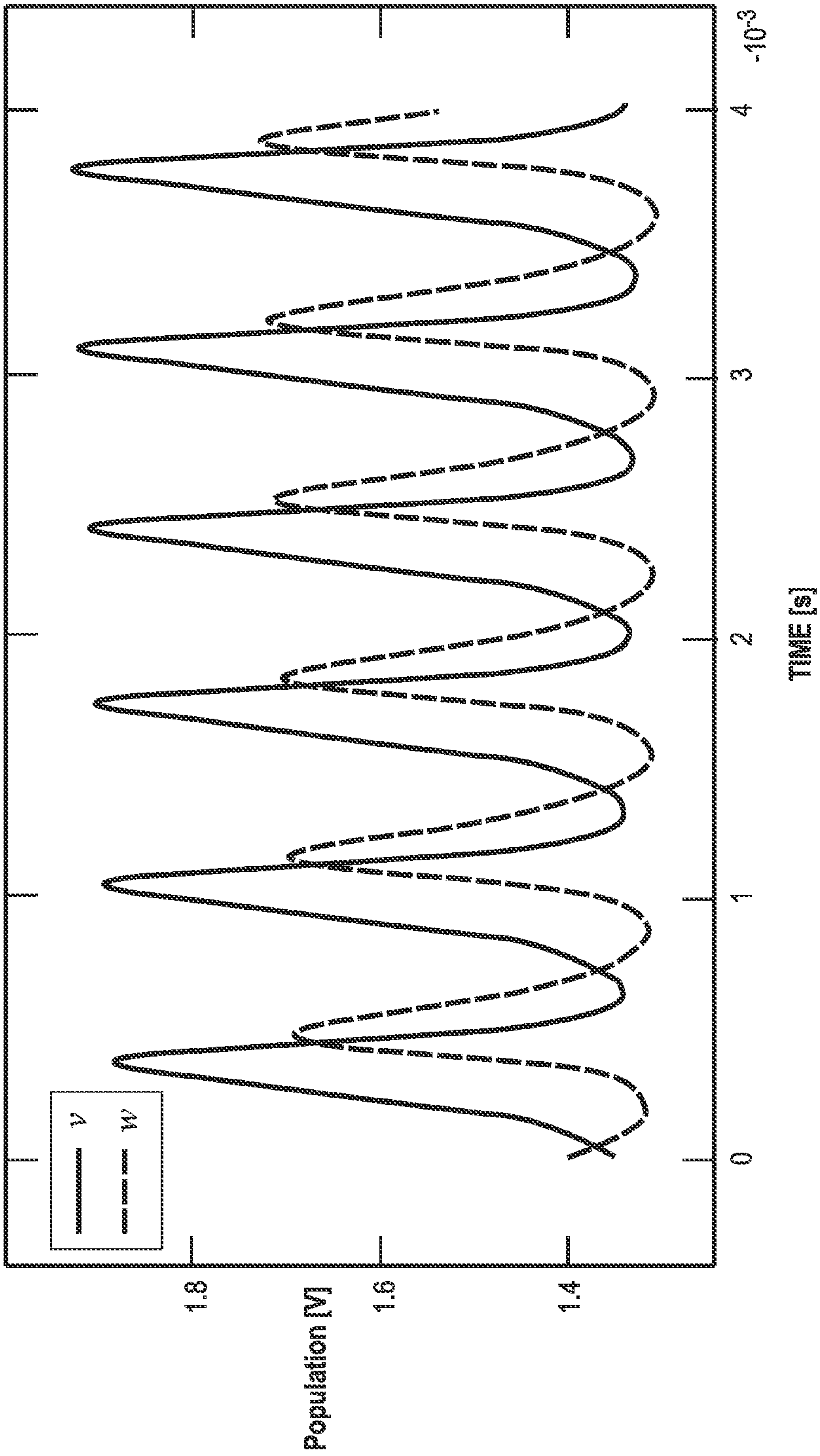
FIG. 5 illustrates the results from the nonlimiting example quantum FPAA of FIG. 3 solving the Lotka-Volterra IVP.

FIG. 5 shows the simulation results with the LTSpice universal op-amp model. The two integration blocks have input resistance of $R_{in}$=100 k and 1 nF capacitors. This results in a time scale factor of $10^3$ (i.e., 40 s of simulation time are simulated in 4 ms). A classical computer takes much longer as it has to evaluate a function at least as many times as there are points in the solution plot, each function evaluation takes multiple clock cycles, and these evaluations can be performed only sequentially.

The methods described herein may, and in many embodiments must, be performed, at least in part, using computing devices or processor-based devices that include a processor; a memory coupled to the processor; and instructions provided to the memory, wherein the instructions are executable by the processor to perform the methods described herein (such as computing or processor-based devices may be referred to generally by the shorthand "computer").

"Computer-readable medium" or "non-transitory, computer-readable medium," as used herein, refers to any non-transitory storage and/or transmission medium that participates in providing instructions to a processor for execution. Such a medium may include, but is not limited to, non-volatile media and volatile media. Non-volatile media includes, for example, NVRAM, or magnetic or optical disks. Volatile media includes dynamic memory, such as main memory. Common forms of computer-readable media include, for example, a floppy disk, a flexible disk, a hard disk, an array of hard disks, a magnetic tape, or any other magnetic medium, magneto-optical medium, a CD-ROM, a holographic medium, any other optical medium, a RAM, a PROM, and EPROM, a FLASH-EPROM, a solid state medium like a memory card, any other memory chip or cartridge, or any other tangible medium from which a computer can read data or instructions. When the computer-readable media is configured as a database, it is to be understood that the database may be any type of database, such as relational, hierarchical, object-oriented, and/or the like.

Accordingly, exemplary embodiments of the present systems and methods may be considered to include a tangible storage medium or tangible distribution medium and prior art-recognized equivalents and successor media, in which the software implementations embodying the present techniques are stored.

For example, a system may comprise: a processor comprising a quantum FPAA that comprises: an array of CABs configured to perform a mathematical operation; and an interconnection network connecting the CABs, the interconnection network comprising communication paths and switches; and a memory coupled to the processor.

In another example, a system may comprise: an integrated chip that comprises: a quantum FPAA that comprises: an array of CABs configured to perform a mathematical operation;

and an interconnection network connecting the CABs, the interconnection network comprising communication paths and switches, the quantum FPAA configured for performing a computation using the array of CABs; a system-on-chip for controlling the computation; one or more ADCs for reading the results of the computation; one or more DACs for configuring the CABs of the quantum FPAA; a memory; and a field-programmable gate array.

Example Embodiments

Clause 1. A quantum FPAA comprising: an array of CABs configured to perform a mathematical operation; and an interconnection network connecting the CABs, the interconnection network comprising communication paths and switches.

Clause 2. The quantum FPAA of Clause 1, wherein the array is a multilayer array.

Clause 3. The quantum FPAA of any of Clauses 1-2, wherein at least one of the CABs is an analog circuit.

Clause 4. The quantum FPAA of any of Clauses 1-3, wherein at least one of the CABs is a universal analog component configured to perform the mathematical operation depending on a configuration of transistor switches.

Clause 5. The quantum FPAA of any of Clauses 1-4, wherein mathematical operation is selected from the group consisting of: gain, logarithmic, exponential, raising of a number to a power, integration, and differentiation.

Clause 6. The quantum FPAA of any of Clauses 1-5, wherein the communication paths are selected from the group consisting of: wires, laser light, and any combination thereof.

Clause 7. The quantum FPAA of any of Clauses 1-6, wherein at least one of the CABs further comprises an operational amplifier, passive components, and transistor switches.

Clause 8. The quantum FPAA of any of Clauses 1-7, wherein the quantum FPAA are formed of one or more materials including a superconducting material.

Clause 9. The quantum FPAA of Clause 8, wherein the superconducting material is selected from the group consisting of niobium—titanium alloys, germanium—niobium alloys, niobium nitride alloys, yttrium barium copper oxide, magnesium diboride, fluorine-doped LaOFeAs, fullerenes, carbon nanotubes, graphene, and any combination thereof.

Clause 10. The quantum FPAA of any of Clauses 1-9, wherein the quantum FPAA comprises one or more Josephson junctions.

Clause 11. The quantum FPAA of any of Clauses 1-10, wherein the quantum FPAA is configured to allow for quantum entanglement.

Clause 12. The quantum FPAA of any of Clauses 1-11, wherein the quantum FPAA is configured to allow for quantum tunneling.

Clause 13. An integrated chip comprising: the quantum FPAA of any of Clauses 1-12 for performing a computation using the array of CABs; a system-on-chip for controlling the computation; one or more ADCs for reading the results of the computation; one or more DACs for configuring the CABs of the quantum FPAA; a memory; and a field-programmable gate array.

Clause 14. A system (e.g., a computer system) comprising the integrated chip of Clause 13.

Clause 15. A method comprising: compiling an algorithm of interest to produce a compiled representation; mapping the compiled representation to yield an intermediate representation; scaling the intermediate representation to yield a scaled intermediate representation; executing the scaled intermediate representation on the quantum FPAA of any of Clauses 1-12; and communicating an approximation of a solution to the algorithm of interest.

Clause 16. The method of Clause 15, wherein the executing of the scaled intermediate representation comprises: calibrating the quantum FPAA; resetting the quantum FPAA; performing the mathematical operations according to the scaled intermediate representation; repeating N times the steps of calibrating, resetting, and performing the mathematical operations; and averaging the results from performing the mathematical operations N times to yield the approximation of the solution to the algorithm of interest.

Clause 17. The method of any of Clauses 15-16, wherein the executing of the scaled intermediate representation comprises: executing the scaled intermediate representation in parallel at least twice on the quantum FPAA.

Clause 18. The method of any of Clauses 15-17 further comprising: repeating the steps of compiling, mapping, scaling, executing, and communicating for a different algorithm of interest with the same quantum FPAA but in a different configuration of the interconnection network.

Clause 19. The method of any of Clauses 15-18, wherein communicating comprises displaying the solution on a display.

Clause 20. A system comprising: a processor comprising a quantum FPAA that comprises: an array of CABs configured to perform a mathematical operation; and an interconnection network connecting the CABs, the interconnection network comprising communication paths and switches; and a memory coupled to the processor.

Clause 21. The system of Clause 20, wherein the array is a multilayer array.

Clause 22. The system of any of Clauses 20-21, wherein at least one of the CABs is an analog circuit.

Clause 23. The system of any of Clauses 20-22, wherein at least one of the CABs is a universal analog component configured to perform the mathematical operation depending on a configuration of transistor switches.

Clause 24. The system of any of Clauses 20-23, wherein mathematical operation is selected from the group consisting of: gain, logarithmic, exponential, raising of a number to a power, integration, and differentiation.

Clause 25. The system of any of Clauses 20-23, wherein the communication paths are selected from the group consisting of: wires, laser light, and any combination thereof.

Clause 26. The system of any of Clauses 20-25, wherein at least one of the CABs further comprises an operational amplifier, passive components, and transistor switches.

Clause 27. The system of any of Clauses 20-26, wherein the quantum FPAA are formed of one or more materials including a superconducting material.

Clause 28. The system of Clause 27, wherein the superconducting material is selected from the group consisting of niobium—titanium alloys, germanium—niobium alloys, niobium nitride alloys, yttrium barium copper oxide, magnesium diboride, fluorine-doped LaOFeAs, fullerenes, carbon nanotubes, graphene, and any combination thereof.

Clause 29. The system of any of Clauses 20-28, wherein the quantum FPAA comprises one or more Josephson junctions.

Clause 30. The system of any of Clauses 20-29, wherein the quantum FPAA is configured to allow for quantum entanglement.

Clause 31. The system of any of Clauses 20-30, wherein the quantum FPAA is configured to allow for quantum tunneling.

Clause 32. A method comprising: compiling an algorithm of interest to produce a compiled representation; mapping the compiled representation to yield an intermediate representation; scaling the intermediate representation to yield a scaled intermediate representation; executing the scaled intermediate representation on the quantum FPAA of the system of any of Clauses 20-31; and communicating an approximation of a solution to the algorithm of interest.

Clause 33. The method of Clause 32, wherein the executing of the scaled intermediate representation comprises: calibrating the quantum FPAA; resetting the quantum FPAA;

performing the mathematical operations according to the scaled intermediate representation; repeating N times the steps of calibrating, resetting, and performing the mathematical operations; and averaging the results from performing the mathematical operations N times to yield the approximation of the solution to the algorithm of interest.

Clause 34. The method of any of Clauses 32-33, wherein the executing of the scaled intermediate representation comprises: executing the scaled intermediate representation in parallel at least twice on the quantum FPAA.

Clause 35. The method of any of Clauses 32-34 further comprising: repeating the steps of compiling, mapping, scaling, executing, and communicating for a different algorithm of interest with the same quantum FPAA but in a different configuration of the interconnection network.

Clause 36. The method of any of Clauses 32-35, wherein communicating comprises displaying the solution on a display.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also “consist essentially of” or “consist of” the various components and steps.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of “comprising,” “containing,” or “including” various components or steps, the compositions and methods can also “consist essentially of” or “consist of” the various components and steps. All numbers and ranges disclosed above may vary by some amount. Whenever a numerical range with a lower limit and an upper limit is disclosed, any number and any included range falling within the range is specifically disclosed. In particular, every range of values (of the form, “from about a to about b,” or, equivalently, “from approximately a to b,” or, equivalently, “from approximately a-b”) disclosed herein is to be understood to set forth every number and range encompassed within the broader range of values. Also, the terms in the claims have their plain, ordinary meaning unless otherwise explicitly and clearly defined by the patentee. Moreover, the indefinite articles “a” or “an,” as used in the claims, are defined herein to mean one or more than one of the element that it introduces.

The invention claimed is:

1. A quantum field-programmable analog array (FPAA) comprising:

an array of computational analog blocks (CABs) configured to perform a mathematical operation, wherein at least one of the CABs comprises an operational amplifier, passive components, and transistor switches, and at least one of the CABs is a universal analog component configured to perform the mathematical operation depending on a configuration of the transistor switches, wherein the universal analog component is further configured to receive an input voltage and provide an output voltage, the input voltage and the output voltage being related by the mathematical operation and depending on the configuration of the transistor switches; and an interconnection network connecting the CABs, the interconnection network comprising communication paths and switches.

2. The quantum FPAA of claim 1, wherein the array is a multilayer array.

3. The quantum FPAA of claim 1, wherein at least one of the CABs is an analog circuit.

4. The quantum FPAA of claim 1, wherein the mathematical operation is selected from the group consisting of gain, logarithmic, exponential, raising of a number to a power, integration, and differentiation.

5. The quantum FPAA of claim 1, wherein the communication paths are selected from the group consisting of wires, laser light, and any combination thereof.

6. The quantum FPAA of claim 1, wherein the quantum FPAA is formed from one or more materials comprising a superconducting material, the superconducting material being is selected from the group consisting of niobium-titanium alloys, germanium-niobium alloys, niobium nitride alloys, yttrium barium copper oxide, magnesium diboride, fluorine-doped LaOFeAs, fullerenes, carbon nanotubes, graphene, and any combination thereof.

7. An integrated chip comprising:

the quantum FPAA of claim 1 for performing a computation using the array of CABs;

a system-on-chip for controlling the computation;

one or more analog to digital converters (ADCs) for reading the results of the computation;

one or more digital to analog converters (DACs) for configuring the CABs of the quantum FPAA;

a memory; and a field-programmable gate array.

8. A system comprising:

a processor comprising a quantum field-programmable analog array (FPAA) that comprises:

an array of computational analog blocks (CABs) configured to perform a mathematical operation, wherein at least one of the CABs comprises an operational amplifier, passive components, and transistor switches, and at least one of the CABs is a universal analog component configured to perform the mathematical operation depending on a configuration of the transistor switches, wherein the universal analog component is further configured to receive an input voltage and provide an output voltage, the input voltage and the output voltage being related by the mathematical operation and depending on the configuration of the transistor switches;

an interconnection network connecting the CABs, the interconnection network comprising communication paths and switches; and a memory coupled to the processor.

9. The system of claim 8, wherein the array is a multilayer array.

10. The system of claim 8, wherein at least one of the CABs is an analog circuit.

11. The system of claim 8, wherein mathematical operation is selected from the group consisting of gain, logarithmic, exponential, raising of a number to a power, integration, and differentiation.

12. The system of claim 8, wherein at least one of the CABs includes an operational amplifier configured to provide feedback and a variable capacitor configured to perform the mathematical operation based on the feedback, and wherein the mathematical operation comprises integration.

* * * * *